US012716014B2

(12) United States Patent
Zhang et al.

(10) Patent No.: US 12,716,014 B2
(45) Date of Patent: Aug. 25, 2026

(54) INSULATION ADHESIVE, INSULATION TAPE, AND INSULATION ADHESIVE PREPARATION METHOD

(71) Applicant: HONOR DEVICE CO., LTD., Shenzhen (CN)

(72) Inventors: Tongkai Zhang, Shenzhen (CN); Jing Gao, Shenzhen (CN); Yin Meng, Shenzhen (CN); Fenxing Lei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 331 days.

(21) Appl. No.: 18/294,379

(22) PCT Filed: Aug. 19, 2022

(86) PCT No.: PCT/CN2022/113735
§ 371 (c)(1),
(2) Date: Feb. 1, 2024

(87) PCT Pub. No.: WO2023/077915
PCT Pub. Date: May 11, 2023

(65) Prior Publication Data

US 2024/0336814 A1 Oct. 10, 2024

(30) Foreign Application Priority Data

Nov. 4, 2021 (CN) ......................... 202111310407.0

(51) Int. Cl.
*C09J 9/00* (2006.01)
*C09J 127/18* (2006.01)
(Continued)

(52) U.S. Cl.
CPC ............... *C09J 9/00* (2013.01); *C09J 127/18* (2013.01); *G03B 17/02* (2013.01); *H04N 23/51* (2023.01)

(58) Field of Classification Search
None
See application file for complete search history.

(56) References Cited

U.S. PATENT DOCUMENTS 8,247,506 B2 8/2012 Tsuji et al.
2005/0100728 A1* 5/2005 Ristic-Lehmann .......................... A41D 19/01529 524/544

(Continued)

FOREIGN PATENT DOCUMENTS

CN 1575312 A 2/2005
CN 101608105 A 12/2009

(Continued)

*Primary Examiner* — Rodney E Fuller
(74) *Attorney, Agent, or Firm* — WOMBLE BOND DICKINSON (US) LLP

(57) ABSTRACT

An insulation adhesive, an insulation tape incorporating the insulation adhesive, and a method for preparing the insulation adhesive. The insulation adhesive includes: an insulation colloid, and an insulation particle doped in the insulation colloid. Breakdown field strength of the insulation particle is greater than breakdown field strength of the insulation colloid. Since the breakdown field strength of the insulation particle is greater than the breakdown field strength of the insulation colloid, the insulation colloid is easier to break down than the insulation particle. When an electro-static discharge current acts on the insulation adhesive, the electro-static discharge current breaks down the insulation colloid that has worse insulation performance and that is easier to break down, and bypasses the insulation particle that has better insulation performance and that is
(Continued)

more difficult to break down, so that a breakdown path of the electro-static discharge current becomes longer.

20 Claims, 6 Drawing Sheets

(51) Int. Cl.
*G03B 17/02* (2021.01)
*H04N 23/51* (2023.01)

(56) References Cited

U.S. PATENT DOCUMENTS

| | | | | |
|---|---|---|---|---|
| 2011/0014357 | A1 | 1/2011 | Lim et al. | |
| 2014/0335341 | A1 | 11/2014 | Park et al. | |
| 2018/0086954 | A1 * | 3/2018 | Morioka | C09J 9/02 |
| 2019/0074104 | A1 | 3/2019 | Kasagi et al. | |

FOREIGN PATENT DOCUMENTS

| | | | | | |
|---|---|---|---|---|---|
| CN | 101955703 | A | | 1/2011 | |
| CN | 103361022 | A | | 10/2013 | |
| CN | 104011163 | A | | 8/2014 | |
| CN | 104130723 | A | * | 11/2014 | C09J 133/04 |
| CN | 204089961 | U | | 1/2015 | |
| CN | 205281445 | U | | 6/2016 | |
| CN | 105907360 | A | | 8/2016 | |
| CN | 106299599 | A | | 1/2017 | |
| CN | 107071098 | A | * | 8/2017 | H04M 1/0279 |
| CN | 207016703 | U | | 2/2018 | |
| CN | 207124671 | U | * | 3/2018 | |
| CN | 109082255 | A | | 12/2018 | |
| CN | 109423011 | A | | 3/2019 | |
| CN | 109423012 | A | | 3/2019 | |
| CN | 109423013 | A | | 3/2019 | |
| CN | 208890914 | U | * | 5/2019 | |
| CN | 110093121 | A | | 8/2019 | |
| CN | 111087843 | A | | 5/2020 | |
| CN | 111100596 | A | | 5/2020 | |
| CN | 111806016 | A | | 10/2020 | |
| CN | 112103018 | A | | 12/2020 | |
| CN | 112805347 | A | | 5/2021 | |
| CN | 113999628 | A | | 2/2022 | |
| GB | 390817 | A | | 4/1933 | |
| JP | H06349339 | A | | 12/1994 | |
| JP | 6140491 | B2 | * | 5/2017 | H04B 1/3833 |
| JP | 2019035059 | A | | 3/2019 | |
| JP | 2019035060 | A | | 3/2019 | |
| JP | 2020148793 | A | * | 9/2020 | H04N 23/50 |
| KR | 100598679 | B1 | | 7/2006 | |
| TW | 201840437 | A | | 11/2018 | |

* cited by examiner

INSULATION ADHESIVE, INSULATION TAPE, AND INSULATION ADHESIVE PREPARATION METHOD

CROSS-REFERENCE TO RELATED APPLICATIONS

This application is a national stage of International Application No. PCT/CN2022/113735, filed on Aug. 19, 2022, which claims priority to Chinese Patent Application No. 202111310407.0, filed on Nov. 4, 2021. The disclosures of both of the aforementioned applications are hereby incorporated by reference in their entireties.

TECHNICAL FIELD

Embodiments of this application relate to the field of insulation adhesive technologies, and in particular, to an insulation adhesive, an insulation tape, and an insulation adhesive preparation method.

BACKGROUND

There is an inevitably gap between two housing components of electronic devices such as a mobile phone and a tablet. For purposes such as dustproofing and waterproofing, an insulation tape is usually used for bonding to block the gap. The insulation tape is usually composed of an insulation film and an insulation adhesive layer adhered to the insulation film. In order to make the insulation adhesive layer sticky, the insulation adhesive layer needs to be doped with a sticky substance, thereby making an insulating property of the insulation adhesive layer lower than that of the insulation film and becoming an insulation weak region. When the housing components on two sides of the gap are insulators, there is a risk of electro-static discharge in the gap, generating an electro-static discharge (ESD, electro-static discharge) current. The ESD current may break down the insulation adhesive layer along a direction of a bonding surface of the insulation adhesive layer, which may cause damage to internal components of the electronic device.

It can be seen that, whether the electronic device has sufficient electro-static protection capabilities to block electro-static discharge depends largely on insulation performance of the insulation adhesive layer. Therefore, how to improve the insulation performance of the insulation adhesive layer used for electro-static protection is crucial to ensuring reliability of the electronic device. Current commonly used methods cannot effectively ensure the insulation performance of the insulation adhesive layer in the direction of the bonding surface.

SUMMARY

Embodiments of this application provide an insulation adhesive, an insulation tape, and an insulation adhesive preparation method, to solve a problem in the prior art that insulation performance of the insulation adhesive layer in a direction of a bonding surface cannot be effectively ensured.

To achieve the foregoing objectives, the following technical solutions are used in the embodiments of this application.

According to a first aspect, an insulation adhesive is provided. The insulation adhesive includes: an insulation colloid and an insulation particle doped in the insulation colloid. Breakdown field strength of the insulation particle is greater than breakdown field strength of the insulation colloid, and the insulation particle is a highly electronegative non-polar insulation particle.

In the insulation adhesive, since the breakdown field strength of the insulation particle is greater than the breakdown field strength of the insulation colloid, the insulation colloid is easier to break down than the insulation particle. When an ESD current acts on the insulation adhesive, the ESD current breaks down the insulation colloid that has worse insulation performance and that is easier to break down, and bypasses the insulation particle that has better insulation performance and that is more difficult to break down, so that a breakdown path of the ESD current becomes longer, and a breakdown voltage required to break down the insulation adhesive is increased, thereby improving the insulation performance of the insulation adhesive.

It should be understood that the insulation particle in the insulation adhesive is embedded in the insulation colloid through doping. Therefore, the insulation particle is distributed at any position in the insulation colloid. In other words, there is no macroscopic difference in the insulation performance of the insulation adhesive in any direction. For an ESD current in any direction, the insulation adhesive may increase a length of a breakdown path of the ESD current to increase a breakdown voltage for breaking down the insulation adhesive, thereby improving the insulation performance in all directions. Based on this, when the insulation adhesive exists as an insulation adhesive layer, certainly, insulation performance of the insulation adhesive layer along a direction of a bonding surface may also be improved.

In addition, the insulation particle is a highly electronegative non-polar insulation particle.

The insulation particle is a highly electronegative insulation particle. It should be noted that a high electronegativity means that an electronegativity of the insulation particle is higher than an electronegativity of the insulation colloid.

In this embodiment, the electronegativity of the insulation particle represents a capability to absorb electrons. When the electronegativity of the insulation particle is higher than the electronegativity of the insulation colloid, the insulation particle has a high electronegativity. Compared with a low electronegativity, a higher electronegativity gives the insulation particle a stronger capability to absorb electrons. On this basis, a large number of electrons are absorbed on a surface of the insulation particle, so that a quantity of electrons in a medium around the insulation particle is reduced. As the quantity of electrons in the medium around the insulation particle decreases, a collision ionization phenomenon in the medium around the insulation particle is weakened, so that there is a sharp decrease in a quantity of ions in the medium around the insulation particle, and the medium around the insulation particle is difficult to break down, thereby improving electrical breakdown resistance of the insulation adhesive, that is, insulation performance.

In addition, the insulation particle is a non-polar insulation particle. Compared with a case in which the insulation particle is polar, when the insulation particle is non-polar, an internal electric field in the same direction as the breakdown field strength may not be generated between two adjacent insulation particles. In this case, a total electric field of the insulation adhesive along a breakdown direction is not a sum of the internal electric field and the breakdown field strength, so that the insulation performance of the insulation adhesive may not be weakened.

Optionally, a material of the insulation colloid includes rubber or a material.

Further, an insulation material used for doping to form the insulation particle includes tetrafluoroethene and/or tetrafluoroethylene polymer. The insulation particle of this insulation material has both a high electronegativity and non-polarity. Therefore, the high electronegativity ensures that the doping of the insulation particle can improve the insulation performance of the insulation adhesive, while the non-polarity ensures that the doping of the insulation particle does not weaken the insulation performance of the insulation adhesive.

Furthermore, the tetrafluoroethylene polymer includes one or more of polytetrafluoroethylene, tetrafluoroethene-hexafluoropropylene copolymer, and heptafluoropropyltrifluorovinylether-polytetrafluoroethylene copolymer.

Optionally, a mass ratio of the insulation particle to the insulation colloid is in a range of 30% to 60%. A doping ratio of the insulation particle should not be too high or too low. Since the insulation particle is not sticky, when the doping ratio is too high, stickiness and strength of the insulation adhesive decrease. When the doping ratio is too low, an improvement effect on the insulation performance of the insulation adhesive is not obvious. In this embodiment, the mass ratio of the insulation particle to the insulation colloid is controlled to be in a range of 30% to 60%, so that the stickiness and strength of the insulation adhesive can be ensured. In addition, the insulation performance of the insulation adhesive can be ensured.

According to a second aspect, an insulation tape is provided. The insulation tape includes: a first film layer and a colloid layer, the colloid layer being laminated on the first film layer. The colloid layer is made of the insulation adhesive according to any one of the first aspect.

In some embodiments of this application, a diameter of the insulation particle is less than one-tenth of a thickness of the colloid layer. It should be understood that the diameter of the insulation particle should not be too large or too small. If the diameter of the insulation particle is too large, the non-sticky insulation particle distributed on a surface of the colloid layer makes surface stickiness of the colloid layer too low; and the non-sticky insulation particle distributed in the colloid layer is not easily bonded to the insulation colloid, resulting in lower overall strength of the colloid layer. In addition, an insulation colloid between any two insulation particles is thin, and consequently, the colloid layer is likely to crack.

In some embodiments of this application, the foregoing insulation tape further includes a second film layer. The second film layer is laminated on a surface of the colloid layer that is away from the first film layer. The existence of the second film layer allows the colloid layer to be protected before use.

According to a third aspect, an insulation adhesive preparation method is provided. The insulation adhesive preparation method includes: processing an insulation colloid to a molten state; doping an insulation particle into the insulation colloid in the molten state and mixing to obtain a to-be-processed insulation adhesive, where breakdown field strength of the insulation particle is greater than breakdown field strength of the insulation colloid, and the insulation particle is a highly electronegative non-polar insulation particle; and performing cooling processing on the to-be-processed insulation adhesive, and obtaining an insulation adhesive.

Optionally, a material of the insulation colloid includes rubber or a material.

Further, an insulation material used for doping to form the insulation particle includes tetrafluoroethene and/or tetrafluoroethylene polymer.

Furthermore, the tetrafluoroethylene polymer includes one or more of polytetrafluoroethylene, tetrafluoroethene-hexafluoropropylene copolymer, and heptafluoropropyltrifluorovinylether-polytetrafluoroethylene copolymer.

Optionally, a mass ratio of the insulation particle to the insulation colloid is in a range of 30% to 60%.

It should be noted that for the technical effects brought by any embodiment in the second aspect and the third aspect, reference may be made to the technical effects brought by the corresponding embodiment in the first aspect, and details are not described herein again.

DESCRIPTION OF EMBODIMENTS

In the embodiments of this application, terms "first" and "second" are used merely for the purpose of description, and shall not be construed as indicating or implying relative importance or implying a quantity of indicated technical features. Therefore, a feature defined by "first" or "second" can explicitly or implicitly includes one or more features.

The term "and/or in the embodiments of this application is only an association relationship for describing associated objects and represents that three relationships may exist. For example, A and/or B may represent the following three cases: A exists alone, A and B exist simultaneously, and B exists alone. In addition, the character "/" in this specification generally indicates an "or" relationship between the associated objects.

In the embodiments of this application, "a plurality of" means more than two (including two).

In the embodiments of this application, orientation terms such as "up" are defined relative to an orientation in which a component is schematically placed in the accompanying drawings. It should be understood that these directional terms are relative concepts that are used for descriptive and clarity purposes, which may vary accordingly depending on the orientation in which the components are placed in the accompanying drawings.

There is an inevitably gap between two housing components of electronic devices such as a mobile phone and a tablet. For purposes such as dustproofing and waterproofing, an insulation tape is usually used for bonding to block the gap. The insulation tape is usually composed of an insulation film and an insulation adhesive layer adhered to the insulation film. In order to make an insulation adhesive sticky, the insulation adhesive layer needs to be doped with a sticky substance, thereby making an insulating property of the insulation adhesive layer lower than that of the insulation film and becoming an insulation weak region. When the housing components on two sides of the gap are insulators, there is a risk of electro-static discharge in the gap. A static electricity current may break down the insulation adhesive layer, which may cause damage to internal components of the electronic device. For ease of understanding, the foregoing scenario in which static electricity occurs is illustrated below using examples with reference to FIG. 1*a* to FIG. 1*c*.

Figure 1A:
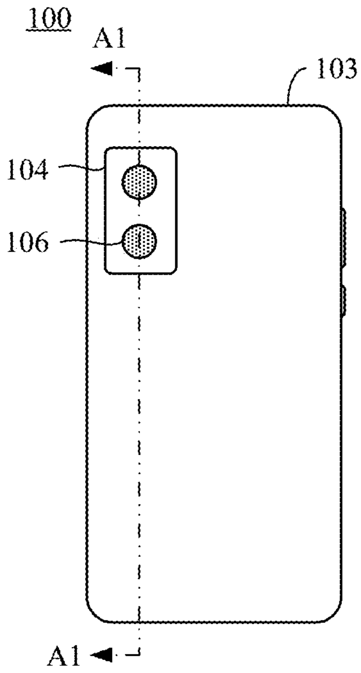
FIG. 1*a* is a schematic structural diagram of an electronic device according to some embodiments of this application.
Figure 1B:
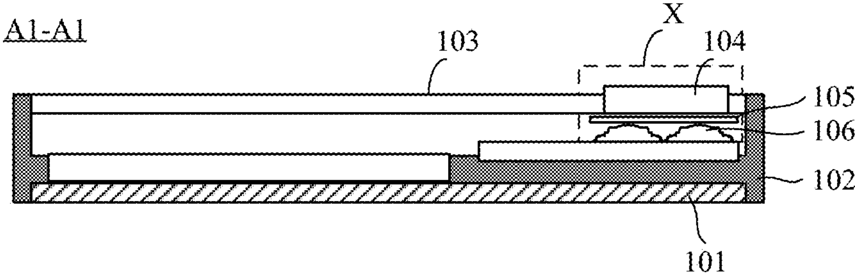
FIG. 1*b* is a cross-sectional view obtained by cutting FIG. 1*a* along a line A1-A1.

For example, FIG. 1*a* is a schematic structural diagram of an electronic device according to some embodiments of this application. An electronic device 100 is a mobile phone, including a rear housing 103, a camera bracket 104 mounted on the rear housing 103, and a camera module 106 disposed in the camera bracket 104. Refer to FIG. 1*b*. FIG. 1*b* is a cross-sectional view obtained by cutting the electronic device shown in FIG. 1*a* along a line A1-A1. As can be seen from the figure, the electronic device 100 includes a display screen 101, a middle frame 102, a rear housing 103, a camera bracket 104 mounted on the rear housing 103, and a camera module 106 arranged below the camera bracket 104 that are laminate from bottom to top. There is usually a gap between the camera bracket 104 and the rear housing 103, and external substances such as liquids and dust may enter the electronic device 100 through the gap, affecting the reliability of the internal component such as the camera module 106. On this basis, a gap 107 is usually bonded by using an insulation tape 105 underneath the gap.

Figure 1C:
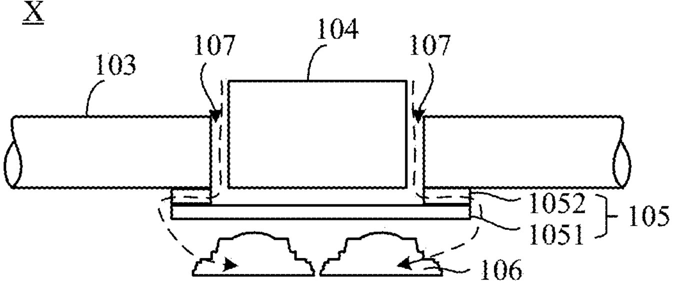
FIG. 1*c* is a partial enlarged view of a region X in FIG. 1*b;*

Specifically, referring to FIG. 1*c*, FIG. 1*c* is a partial enlarged view of a region X in FIG. 1*b*. This figure shows the gap 107 between the camera bracket 104 and the rear housing 103. To block the gap 107, the insulation tape 105 generally includes an insulation film 1051 and an insulation adhesive layer 1052 attached to the insulation film 1051. The insulation film 1051 is attached to a region of the rear housing 103 on both sides of the camera bracket 104 and is bonded through the insulation adhesive layer 1052. It should be noted that since the camera bracket 104 and the rear housing 103 are usually made of a non-metallic insulation material, when static charges accumulate to a certain extent, an ESD phenomenon occurs through the gap 107, thereby generating an ESD current. Although the foregoing insulation adhesive layer 1052 can block substances from entering the interior of the electronic device 100, the insulation adhesive layer 1052 cannot block the ESD current that exceeds the insulation capability of the insulation adhesive layer 1052. The ESD current may break down the insulation adhesive layer 1052 along a direction indicated by a dotted arrow in the figure, thereby causing damage to the internal component such as the camera module 106.

It can be seen from FIG. 1*c* that, whether the electronic device 100 has sufficient electro-static protection capabilities to block electro-static discharge depends largely on insulation performance of the insulation adhesive layer 1052. Therefore, how to improve the insulation performance of the insulation adhesive layer 1052 used for electro-static protection is crucial to ensuring reliability of the electronic device 100. Currently, a commonly used method is to design the insulation adhesive layer 1052 into a structure of an anisotropic insulation adhesive to improve the insulation performance.

Figure 2:
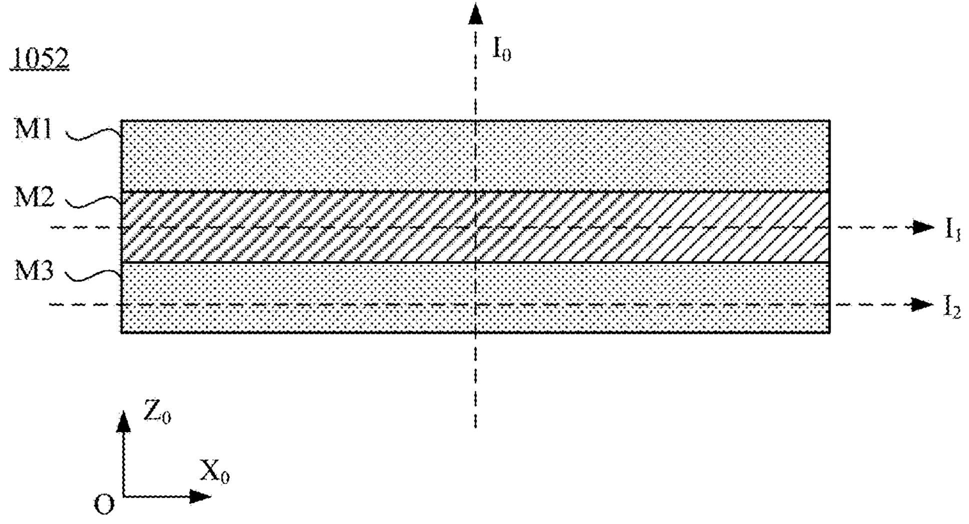
FIG. 2 is a schematic structural diagram of an insulation adhesive layer in a possible design solution.

For example, referring to FIG. 2, FIG. 2 is a schematic structural diagram of an insulation adhesive layer in a possible design solution. The insulation adhesive layer 1052 is of a composite layer structure, including a first insulation adhesive layer M1, a PET film layer M2, and a second insulation adhesive layer M3 that are laminate in sequence. For ease of the following description, an O-X0Z0 coordinate system is established in FIG. 2. An X0 direction is a direction of a bonding surface of the insulation adhesive layer 1052, and a Z0 direction is a lamination direction of each composite layer in the insulation adhesive layer 1052. The bonding surface of the insulation adhesive layer 1052 is a surface used for bonding with other structures, and the X0 direction is perpendicular to the Z0 direction. It should be understood that the insulation adhesive layer 1052 is usually of a sheet structure during use. The bonding surface of the insulation adhesive layer 1052 is a wide surface of the sheet structure, the X0 direction is a direction of the wide surface of the sheet structure, and the Z0 direction is a thickness direction of the sheet structure.

When an ESD current I0 along the Z0 direction acts on the insulation adhesive layer 1052, the ESD current I0 needs to break down the second insulation adhesive layer M3, the PET film layer M2, and the first insulation adhesive layer M1 in sequence, to completely break down the insulation adhesive layer 1052. Since insulation performance of the PET film layer M2 is higher than that of the insulation adhesive layer, the existence of the PET film layer M2 increases a difficulty of breakdown in this breakdown path, thereby increasing insulation performance of the insulation adhesive layer 1052 along the Z0 direction.

However, the insulation adhesive layer 1052 obtained by laminating the PET film layer M2 along the Z0 direction increases the insulation performance along the Z0 direction, and insulation performance along the X0 direction cannot be effectively ensured. Specifically, when an ESD current I1 along the X0 direction acts on the PET film layer M2 of the insulation adhesive layer 1052, the insulation performance of the insulation adhesive layer 1052 along the X0 direction depends on the PET film layer M2; and when an ESD current I2 along the X0 direction acts on other positions (such as the second insulation adhesive layer M3) than the PET film layer M2, the insulation performance of the insulation adhesive layer 1052 along the X0 direction mainly depends on the insulation adhesive layer (such as the second insulation adhesive layer M3), and the PET film layer M2 may completely lose its effectiveness. Therefore, for an application scenario of the ESD current breaking down along the X0 direction (a scenario shown in FIG. 1*c*), the insulation adhesive layer 1052 shown in FIG. 2 cannot effectively ensure the electro-static protection capability of the electronic device.

In addition, since a width of the insulation adhesive layer 1052 along the X0 direction is large, when the PET film is laminated along the Z0 direction, the PET film layer M2 can form a stronger bond force with the first insulation adhesive layer M1 and the second insulation adhesive layer M3 respectively, thereby forming a stable and reliable composite layer structure. However, since a thickness of the insulation adhesive layer 1052 along the Z0 direction is small, if the PET film is laminated along the X0 direction, the insulation adhesive layer 1052 cannot form a good bond force with the composite layers on both sides, and consequently the insulation adhesive layer 1052 has problems of easy delamination and poor strength. In other words, the solution of laminating the PET film is suitable for increasing the insulation performance of the insulation adhesive layer 1052 along the Z0 direction, but is not suitable for increasing the insulation performance of the insulation adhesive layer 1052 along the X0 direction.

On this basis, to improve the insulation performance of the insulation adhesive layer 1052 along the X0 direction, an embodiment of this application provides an insulation tape and an insulation adhesive. The following describes in detail the insulation tape and the insulation adhesive provided in this embodiment of this application with reference to FIG. 3 to FIG. 5.

Figure 3:
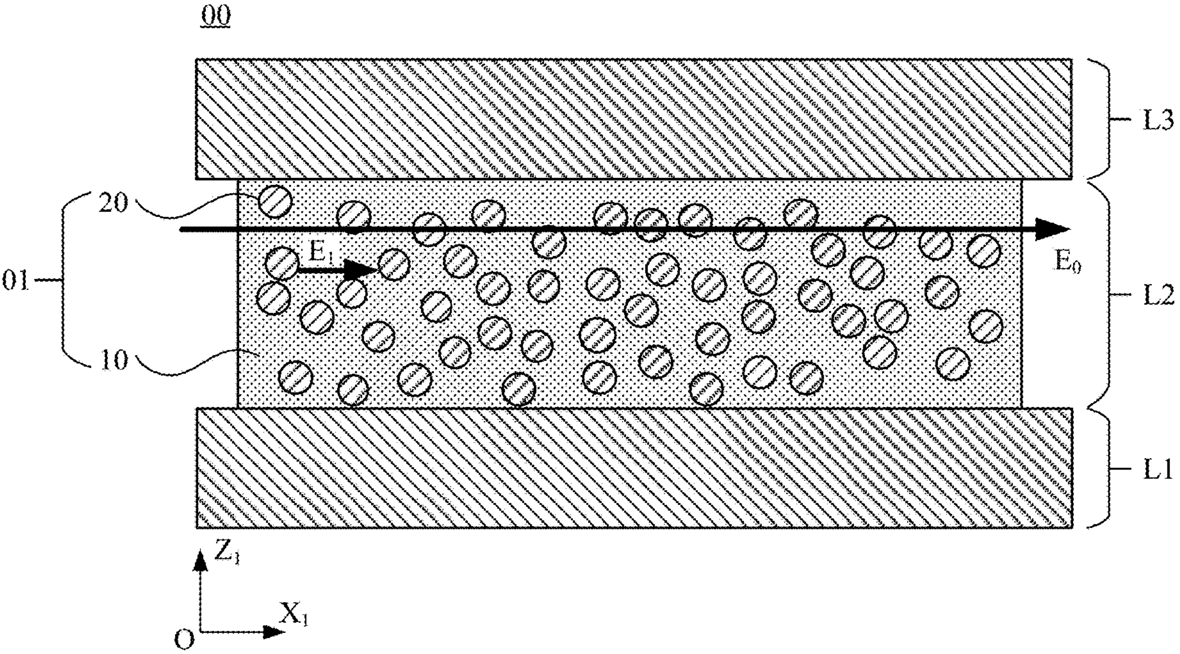
FIG. 3 is a schematic cross-sectional structural diagram of an insulation tape according to some embodiments of this application.

Refer to FIG. 3. FIG. 3 is a schematic cross-sectional structural diagram of an insulation tape according to some embodiments of this application. An insulation tape 00 includes a first film layer L1, a colloid layer L2, and a second film layer L3 that are laminated in sequence.

The first film layer L1 and the second film layer L3 are used to adhere the colloid layer L2. In an actual use process, a user can use the colloid layer L2 for double-sided bonding by uncovering the first film layer L1 and the second film layer L3. Certainly, the colloid layer L2 can also be used for single-sided bonding by uncovering the first film layer L1 or the second film layer L3. For example, a material of the first film layer L1 and the second film layer L3 may be polyethylene glycol terephthalate (polyethylene glycol terephthalate, PET), polyvinyl chloride (polyvinyl chloride, PVC), or polyethylene (polyethene, PE).

The colloid layer L2 is made of an insulation adhesive 01. The insulation adhesive 01 includes an insulation colloid 10 and an insulation particle 20 doped in the insulation colloid 10. Breakdown field strength of the insulation particle 20 is greater than breakdown field strength of the insulation colloid 10.

It should be noted that FIG. 3 illustrates a specific internal structure of the insulation adhesive 01 forming the colloid layer L2. This embodiment of this application does not illustrate the insulation adhesive 01 separately. For ease of the following description, an O-X1Z1 coordinate system is established in FIG. 3. An X1 direction is a direction of a bonding surface of the colloid layer L2. A Z1 direction is a lamination direction of the first film layer L1, the colloid layer L2, and the second film layer L3, and is also a thickness direction of the colloid layer L2. In addition, for an X1 direction, a Y1 direction, and a Z1 direction illustrated in other figures in the embodiments of this application, reference may be made to the implementation of the corresponding direction in FIG. 3, and details are not described again.

In the insulation tape 00 shown in FIG. 3, since the breakdown field strength of the insulation particle 20 is greater than the breakdown field strength of the insulation colloid 10, insulation performance of the insulation particle 20 is greater than insulation performance of the insulation colloid 10, and the insulation colloid 10 is easier to break down than the insulation particle 20. When an ESD current along the X1 direction acts on the colloid layer L2 shown in FIG. 3, the ESD current breaks down the insulation colloid 10 that has worse insulation performance and that is easier to break down, and bypasses the insulation particle 20 that has better insulation performance and that is more difficult to break down. (a) in FIG. 4 shows a schematic diagram of a breakdown path of an ESD current along the X1 direction.

Figure 4:
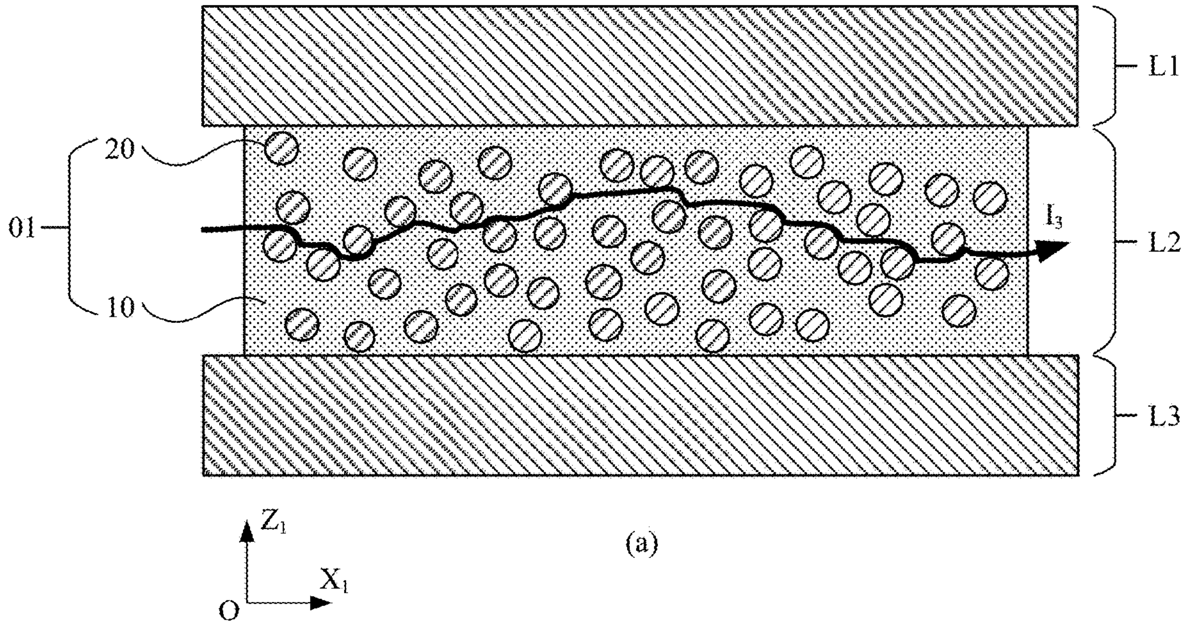
FIG. 4 is a relationship comparison diagram of an impact of an insulation particle on an ESD current breakdown path according to some embodiments of this application.
Figure 4:
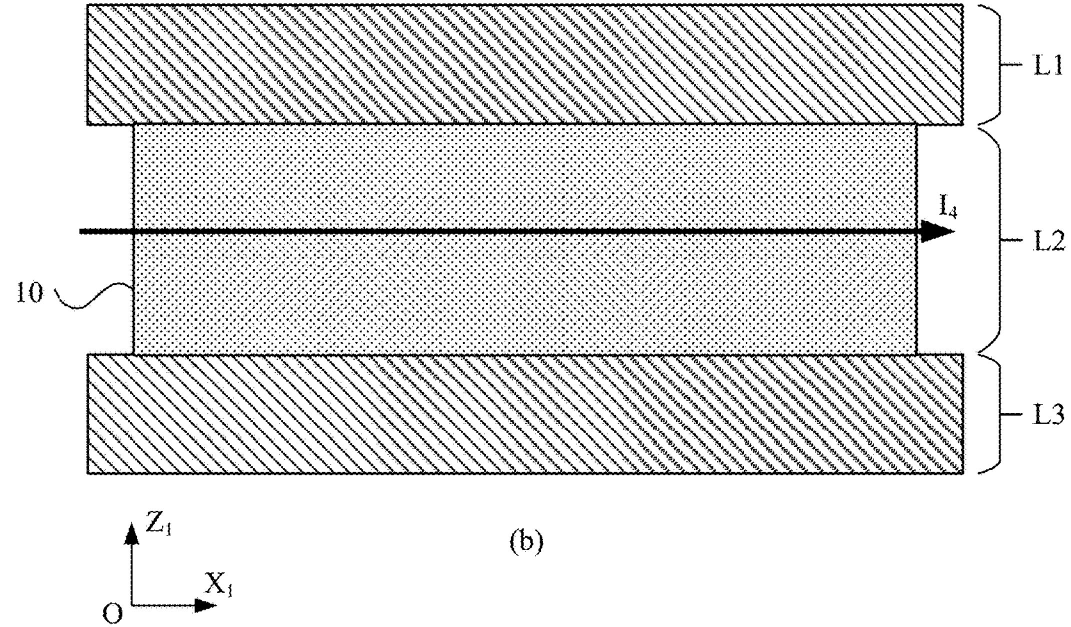

Refer to FIG. 4. FIG. 4 is a relationship comparison diagram of an impact of an insulation particle 20 on an ESD current breakdown path according to some embodiments of this application. The insulation tape shown in (a) in FIG. 4 is the insulation tape 00 shown in FIG. 3, and the colloid layer L2 is made of the insulation adhesive 01 doped with the insulation particle 20. Different from (a) in FIG. 4, in the insulation tape shown in (b) in FIG. 4, the colloid layer L2 is made of the insulation adhesive that is not doped with the insulation particle 20 shown in (a) in FIG. 4, that is, made of the insulation colloid 10 shown in (a) in FIG. 4.

By comparing a breakdown path of an ESD current I3 (a thick line with an arrow in the figure) in (a) in FIG. 4 and a breakdown path of an ESD current I4 (a thick line with an arrow in the figure) in (b) in FIG. 4, it can be found that the existence of the insulation particle 20 makes the breakdown path of the ESD current longer. According to a field strength differential formula, when the breakdown path becomes longer, a breakdown voltage required to break down the colloid layer L2 along the X1 direction increases. Therefore, insulation performance of the colloid layer L2 along the X1 direction can be improved.

In addition, it should be understood that in (a) in FIG. 4, the insulation particle 20 in the colloid layer L2 is doped in the entire Z1 direction. Therefore, no matter where the ESD current I3 acts on the colloid layer L2 along the Z1 direction, the breakdown path can be lengthened and is not affected by the action position. In other words, compared with the insulation adhesive layer 1052 shown in FIG. 2, the insulation performance of the colloid layer L2 along the X1 direction does not differ from that in the Z1 direction, and the insulation performance is more stable and reliable.

It should be noted that although (a) in FIG. 4 shows the ESD current I3 along the X1 direction to illustrate that the insulation performance of the colloid layer L2 in FIG. 3 along the X1 direction is improved, it should be understood that the insulation performance along the Z1 direction in FIG. 3 is also improved, and the principle is similar, which will not be described herein again. In other words, the insulation performance of the colloid layer L2 in this embodiment of this application is improved in all directions during use.

Further, still refer to FIG. 3. In some embodiments of this application, the insulation particle 20 is a highly electronegative non-polar insulation particle, that is, the insulation particle 20 is both a highly electronegative insulation particle and a non-polar insulation particle. It should be noted that the insulation particle 20 is a highly electronegative insulation particle, which means that an electronegativity of the insulation particle 20 is higher than an electronegativity of the insulation colloid 10.

For example, the insulation colloid 10 is made of an organic insulation material. For example, the organic insulation material may include rubber or plastic. The rubber may include natural rubber or synthetic rubber, and the synthetic rubber may include nitrile, silicone rubber, or styrene-butadiene rubber. The plastic may include thermoplastic and thermosetting plastic, and thermoplastic may include acrylic, epoxy resin, or phenolic resin. The thermoplastic may include acrylic, PE, PVC, or PET. In this case, an insulation material used for doping to form the insulation particle 20 includes tetrafluoroethene and/or tetrafluoroethylene polymer.

The tetrafluoroethylene polymer may include one or more of polytetrafluoroethylene, tetrafluoroethene-hexafluoropropylene copolymer, and heptafluoropropyltrifluorovinylether-polytetrafluoroethylene copolymer.

It should be noted that there are many factors that affect the breakdown field strength of the insulation particle 20, for example, a material, an electronegativity, and non-polarity. In other words, the high electronegativity and the non-polarity of the insulation colloid 10 help to increase the breakdown field strength of the insulation particle 20, thereby helping to make the breakdown field strength of the insulation particle 20 higher than the breakdown field strength of the insulation colloid 10. However, the breakdown field strength of the insulation particle 20 is higher than the breakdown field strength of the insulation colloid 10, which does not mean that the electronegativity of the insulation colloid 10 is definitely higher than the electronegativity of the insulation colloid 10, and the insulation particles 20 is definitely non-polar. In some embodiments, when the electronegativity of the insulation colloid 10 is lower than the electronegativity of the insulation colloid 10, and/or the insulation particle 20 is polar, the breakdown field strength of the insulation particle 20 may also be higher than the breakdown field strength of the insulation colloid 10. The electronegativity and the non-polarity of the insulation particle 20 in this embodiment will be discussed separately below.

First, the electronegativity of the insulation particle 20 represents a capability to absorb electrons. When the electronegativity of the insulation particle 20 is higher than the electronegativity of the insulation colloid 10, the insulation particle 20 has a high electronegativity. Compared with a low electronegativity, a higher electronegativity gives the insulation particle a stronger capability to absorb electrons, thereby increasing a breakdown voltage of a medium around the insulation particle 20. The specific reasons are analyzed below with reference to FIG. 5.

Figure 5:
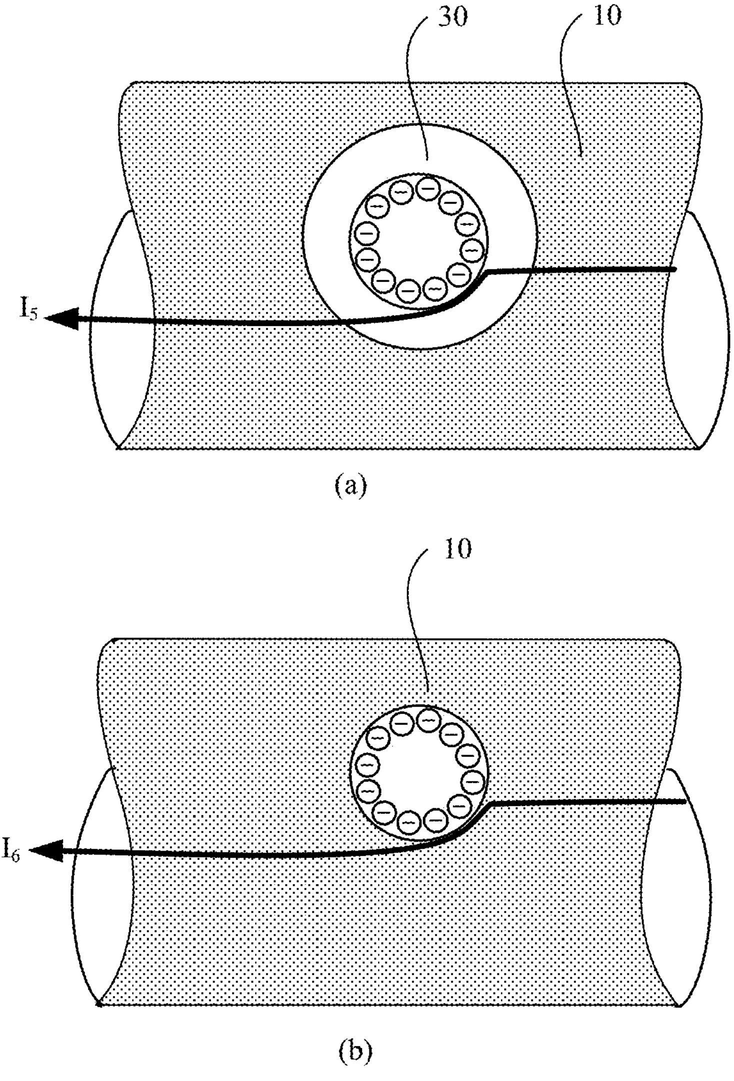
FIG. 5 is a schematic diagram of a breakdown path of an ESD current in a medium around an insulation particle according to some embodiments of this application.

Refer to FIG. 5. FIG. 5 is a schematic diagram of a breakdown path of an ESD current in a medium around an insulation particle 20 according to some embodiments of this application. For ease of presentation, the insulation particle 20 in FIG. 5 is not filled. It should be noted that the medium around the insulation particle 20 is divided into the following cases.

Case 1: The Medium Around the Insulation Particle 20 is an Air Gap 30.

Refer to (a) in FIG. 5. When the insulation particle 20 and the insulation colloid 10 are not completely attached, there is a tiny air gap 30 between the insulation particle 20 and the insulation colloid 10 that wraps the insulation particle 20. In this case, the medium around the insulation particle 20 is the air gap 30, and an ESD current I5 continues to flow by breaking down the air gap 30. It should be understood that for ease of presentation, a size of the air gap 30 is enlarged in this figure. In an actual implementation, the size of the air gap 30 is much smaller than that shown in the figure.

A process of breaking down the air gap 30 is an electron avalanche process. Specifically, referring to FIG. 6, an electron N1 moves directionally under the action of an electric field. When the electric field is strong enough, the electron N1 is accelerated and hits a neutral air molecule, ionizing a new electron N2 and a new ion (not shown in the figure). In the same process, the electron N1 and the electron N2 hit neutral air molecules under the action of the electric field, the electron N1 ionizes a new electron N3 and a new ion (not shown in the figure), and the electron N2 ionizes a new electron N4 and a new ion (not shown in the figure). By analogy, more electrons and ions will be produced, and therefore, a quantity of electrons and ions will increase like an avalanche. Still refer to FIG. 5. When the electron avalanche process in the air gap 30 is strong enough so that the quantity of ions in the air gap 30 is large enough, the air gap 30 is broken down.

In this embodiment, since the insulation particle 20 has a higher capability to absorb electrons, a large quantity of electrons are absorbed on the surface of the insulation particle 20, resulting in a reduction in the quantity of electrons in the air gap 30. As the quantity of electrons in the air gap 30 decreases, the collision ionization phenomenon in the air gap 30 is weakened, causing the quantity of ions in the air gap 30 to decrease sharply, and making it difficult to break down the air gap 30. It should be understood that if the electric field intensity is stronger, the foregoing collision ionization phenomenon is stronger, and therefore, the quantity of electrons and ions in the air gap 30 is larger. Based on this, to break down the air gap 30 around the insulation particle 20, the electric field intensity needs to be increased. According to a field strength formula, when the gap remains unchanged, a stronger breakdown voltage is required.

Case 2: The Medium Around the Insulation Particle 20 is the Insulation Colloid 10.

Refer to (b) in FIG. 5. When the insulation particle 20 and the insulation colloid 10 are completely attached, the insulation colloid 10 tightly wraps the insulation particle 20. In this case, the medium around the insulation particle 20 is the insulation colloid 10. An ESD current I6 breaks down the insulation colloid 10 and continues to flow.

Different from the breakdown of the air gap 30 shown in (a) in FIG. 5, the breakdown of the insulation colloid 10 is the breakdown of a solid. The breakdown process is specifically as follows. When the electric field intensity is large enough, the electron N1 moves directionally under the action of the electric field, running from one potential well to another potential well, forming directional movement, to hit a solid molecule of the insulation colloid 10. In this way, an electron avalanche process in the insulation colloid 10 is generated. This process is similar to what occurs in the air gap 30 and will not be described herein again. Similarly, when the insulation particle 20 has a higher capability to absorb electrons, a large quantity of electrons are absorbed on the surface of the insulation particle 20, resulting in a reduction in the quantity of electrons in the insulation colloid 10 around the insulation particle 20. As the quantity of electrons decreases, the collision ionization in the insulation colloid 10 around the insulation particle 20 is weakened, and consequently, the quantity of ions in the insulation colloid 10 around the insulation particle 20 decreases sharply, making it difficult break down. Based on this, in order to break down the insulation colloid 10 around the insulation particle 20, a stronger breakdown voltage is required.

Based on the above, it can be seen from the content of Case 1 and Case 2 that, when the ESD current flows through the medium around the insulation particle 20, the existence of the insulation particle 20 with a higher electronegativity requires a stronger breakdown voltage to break down the medium around the insulation particle 20. Based on this, the insulation performance of the insulation adhesive 01 (that is, the colloid layer L2) shown in FIG. 3 is improved.

In addition, still refer to FIG. 3. When the insulation particle 20 is non-polar, it means that the polarizability of the insulation particle 20 is low, that is, polarization is not prone to occur under the action of an electric field. Compared with a case in which the insulation particle 20 is polar, the non-polar insulation particle 20 does not reduce the breakdown voltage of the insulation adhesive 01, and thus does not reduce the insulation performance of the insulation adhesive 01. The specific reasons are analyzed below with reference to FIG. 7.

Figures 6, 7:
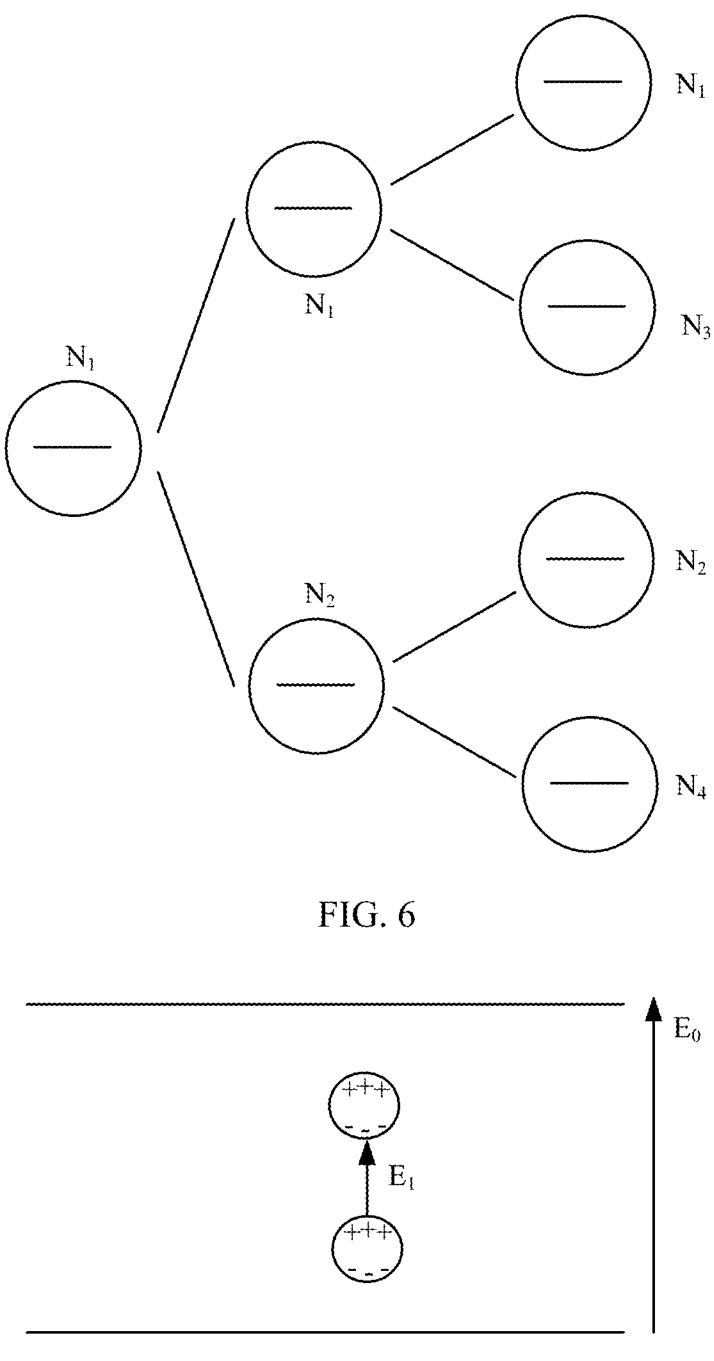
FIG. 6 is a schematic diagram of a change in a quantity of electrons in an electron avalanche process according to some embodiments of this application.
FIG. 7 is a schematic diagram of polarization of a polar molecule under the action of an electric field according to some embodiments of this application.

Refer to FIG. 7. FIG. 7 is a schematic diagram of polarization of a polar molecule under the action of an electric field. It can be seen from FIG. 7 that the polar molecule is polarized under the action of an external electric field E0, so that one end is positively charged and the other end is negatively charged. An internal electric field E1 in the same direction as the external electric field E0 is formed between any two adjacent polar molecules.

For this embodiment, still referring to FIG. 3, when the ESD current breaks down the colloid layer L2 along the X1 direction, the direction of the external electric field E0 is the X1 direction. When the insulation particle 20 is polar, the internal electric field E1 in the same direction as the breakdown field strength is formed between any two adjacent insulation particles 20, that is, the internal electric field E1 in the X1 direction. In this case, a total electric field of the colloid layer L2 along the X1 direction is a sum of the internal electric field E1 and the external electric field E0, making the colloid layer L2 easier to break down and weakening the insulation performance of the colloid layer L2 along the X1 direction. When the insulation particle 20 is non-polar, the internal electric field E1 is not formed, so that the insulation performance of the colloid layer L2 along the X1 direction is not weakened.

It can be seen from the foregoing analysis that the electronegativity and the non-polarity of the insulation particle 20 have an effect on ensuring the insulation performance of the colloid layer L2. Based on this, the concepts of the electronegativity and the non-polarity of the insulation particle 20 can be implemented in separate embodiments, that is, in some embodiments, the electronegativity of the insulation particle 20 is higher than the electronegativity of the insulation colloid 10 without the need for the insulation particle 20 to be non-polar. In this case, the material of the insulation particle 20 may include vinylidene fluoride polymer, vinylidene fluoride copolymer, chlorotrifluoroethylene polymer, or chlorotrifluoroethylene copolymer. In some other embodiments, the insulation particle 20 is non-polar, and the electronegativity of the insulation particle 20 is not necessarily higher than the electronegativity of the insulation colloid 10. In this case, the insulation particle 20 may be made of a material whose breakdown field strength is greater than the breakdown field strength of the insulation colloid 10 among the foregoing organic insulation materials. This is not specifically limited in the embodiments of this application.

In some embodiments of this application, still refer to FIG. 3. To ensure strength and stickiness of the colloid layer L2, a diameter of the insulation particle 20 is less than or equal to one-tenth of a diameter of the colloid layer L2. For example, the diameter of the insulation particle 20 may be one-tenth of the diameter of the colloid layer L2, or may be one-eleventh of the diameter of the colloid layer L2.

It should be understood that the diameter of the insulation particle 20 should not be too large. If the diameter of the insulation particle 20 is too large, the non-sticky insulation particle 20 distributed on the surface of the colloid layer L2 makes the surface stickiness of the colloid layer L2 too low; and the non-sticky insulation particle 20 distributed in the colloid layer L2 is not easily bond with the insulation colloid 10, resulting in a lower overall strength of the colloid layer L2. In addition, the insulation colloid 10 between two insulation particles 20 is thin, causing the colloid layer L2 to easily crack in the Z1 direction.

In some other embodiments of this application, still refer to FIG. 3. To ensure the strength and stickiness of the colloid layer L2, a mass ratio of the insulation particle 20 to the insulation colloid 10 is in a range of 30% to 60%. For example, the mass ratio of the insulation particle 20 to the insulation colloid 10 is 30%, 45%, 50%, 55%, and 60%.

It should be understood that, the doping ratio of the insulation particle 20 should not be too high or too low. Since the insulation particle 20 is not sticky, when the doping ratio is too high, stickiness and strength of the insulation adhesive decrease. When the doping ratio is too low, an improvement effect on the insulation performance of the insulation adhesive is not obvious. In this embodiment, the mass ratio of the insulation particle 20 to the insulation colloid 10 is controlled to be in a range of 30% to 60%, so that the stickiness and strength of the insulation adhesive can be ensured. In addition, the insulation performance of the insulation adhesive can be ensured.

Figure 8:
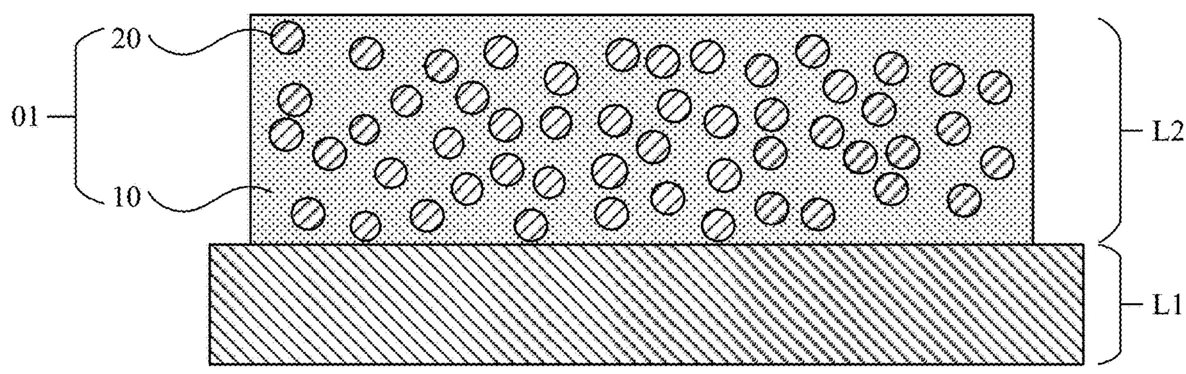
FIG. 8 is a schematic cross-sectional structural diagram of an insulation tape according to some other embodiments of this application.
Figure 8:
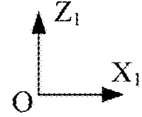

It should be noted that FIG. 3 uses an example in which the insulation tape 00 includes two film layers for description. In another embodiment, the insulation tape 00 may alternatively include only one film layer. Refer to FIG. 8. The insulation tape 00 includes a first film layer L1 and a colloid layer L2. The colloid layer L2 is laminated on the first film layer L1. For the specific implementation of the first film layer L1 and the colloid layer L2, reference may be made to the relevant content shown in FIG. 3, and details are not described herein again. In an actual production process, the insulation tape 00 can be produced by rolling, which is similar to a rolling method of a transparent tape on the market. In an actual use process, a user can use the colloid layer L2 for double-sided bonding by uncovering the first film layer L1. Certainly, the colloid layer L2 with the first film layer L1 can also be directly used for single-sided bonding.

Figure 9:
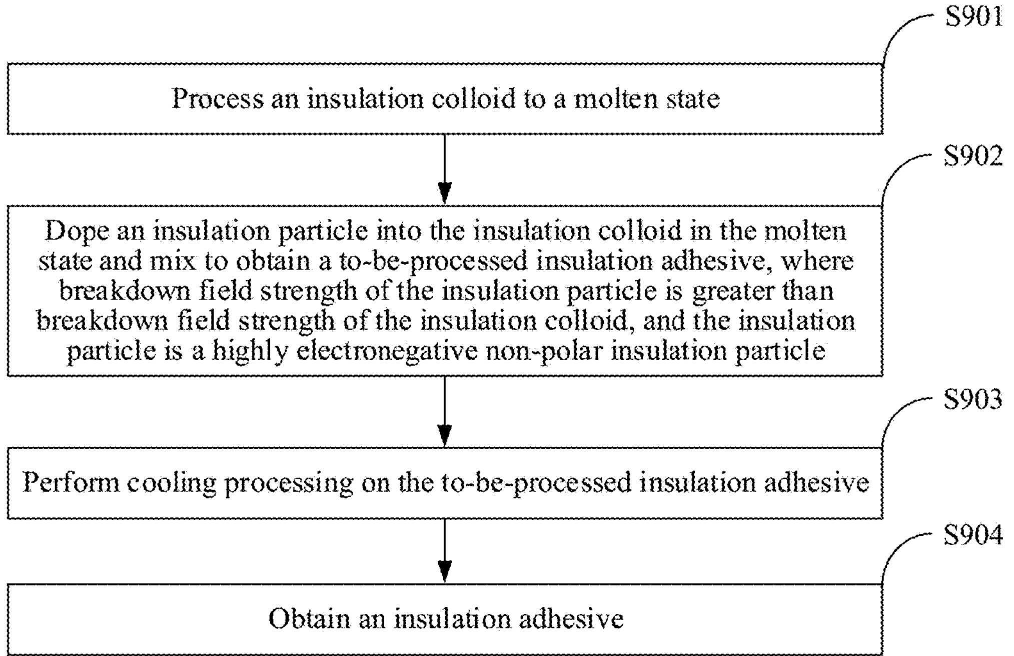
FIG. 9 is a flowchart of an insulation adhesive preparation method according to an embodiment of this application.

To obtain the insulation adhesive shown in the foregoing embodiments, the embodiments of this application further provide an insulation adhesive preparation method. Refer to FIG. 9. The insulation adhesive preparation method includes the following steps.

S901. Process an insulation colloid to a molten state.

S902. Dope an insulation particle into the insulation colloid in the molten state and mix to obtain a to-be-processed insulation adhesive, where breakdown field strength of the insulation particle is greater than breakdown field strength of the insulation colloid, and the insulation particle is a highly electronegative non-polar insulation particle.

S903. Perform cooling processing on the to-be-processed insulation adhesive.

S904. Obtain an insulation adhesive.

In a specific implementation process, according to different types of insulation adhesives, after cooling processing is performed on the to-be-processed insulation adhesive, other processing may be further performed adaptively to obtain the required insulation adhesive. For example, if the insulation adhesive is a foam glue, the to-be-processed insulation adhesive can be foamed after S903 and before S904, and then shaped and processed to obtain the insulation adhesive. If the insulation adhesive is not a foam glue, the to-be-processed insulation adhesive is directly shaped and processed after S903 and before S904 to obtain the insulation adhesive. It should be noted that the materials and the mass ratios of the insulation colloid and the insulation particle, and the diameter of the insulation particle have been described in detail in the relevant embodiments in FIG. 3. Reference may be made to the embodiments and details are not described herein again.

The foregoing descriptions are merely specific implementations of embodiments of this application, but are not intended to limit the protection scope of embodiments of this application. Any variation or replacement within the technical scope disclosed in the embodiments of this application shall fall within the protection scope of embodiments of this application. Therefore, the protection scope of embodiments of this application shall be subject to the protection scope of the claims.

What is claimed is:

1. A housing assembly, configured to protect a camera module in an electronic device, wherein the camera module is located on one side of the housing assembly, and the housing assembly comprising:

a rear housing and a camera bracket mounted on the rear housing, wherein there is a gap between the camera bracket and the rear housing; and the rear housing is connected to an insulation tape, the insulation tape is located between the rear housing and the camera module, and the insulation tape isolates the gap from the camera module; and wherein the insulation tape comprises:

an insulation colloid and an insulation particle, and the insulation particle is doped in the insulation colloid, wherein breakdown field strength of the insulation particle is greater than breakdown field strength of the insulation colloid such that, under an electrostatic discharge (ESD), an electrostatic discharge current preferentially breaks down the insulation colloid and bypasses the insulation particle to lengthen a breakdown path, the insulation particle is a highly electronegative non-polar insulation particle configured to suppress electron avalanche breakdown in a medium surrounding the insulation particle, and an electronegativity of the insulation particle is greater than an electronegativity of the insulation colloid.

2. The housing assembly according to claim 1, wherein an insulation material of the insulation particle comprises tetrafluoroethene and/or tetrafluoroethylene polymer.

3. The housing assembly according to claim 2, wherein the tetrafluoroethylene polymer comprises one or more of polytetrafluoroethylene, tetrafluoroethene-hexafluoropropylene copolymer, and heptafluoropropyltrifluorovinylether-polytetrafluoroethylene copolymer.

4. The housing assembly according to claim 1, wherein a mass ratio of the insulation particle to the insulation colloid is in a range of 30% to 60%.

5. The housing assembly according to claim 4, wherein the mass ratio of the insulation particle to the insulation colloid is 30%, 45%, 50%, 55%, or 60%.

6. The housing assembly according to claim 1, wherein a material of the insulation colloid is rubber or plastic.

7. The housing assembly according to claim 6, wherein the rubber comprises nitrile, silicone rubber, or styrene-butadiene rubber; and the plastic comprises acrylic, epoxy resin, phenolic resin, PE, PVC, or PET.

8. The housing assembly according to claim 1, wherein the insulation tape comprises an insulation film and an insulation adhesive layer, two ends of the insulation film are bonded on the rear housing through the insulation adhesive layer, and the insulation film and the insulation adhesive layer jointly isolate the gap from the camera module.

9. The housing assembly according to claim 8, wherein the insulation adhesive layer comprises:

a first film layer and a colloid layer, wherein the first film layer is adhered to one side of the colloid layer.

10. The housing assembly according to claim 9, wherein the insulation adhesive layer further comprises:

a second film layer, wherein the second film layer is adhered to one side of the colloid layer that is away from the first film layer.

11. The housing assembly according to claim 10, wherein a diameter of the insulation particle is less than or equal to one-tenth of a thickness of the colloid layer.

12. The housing assembly according to claim 9, wherein a diameter of the insulation particle is less than or equal to one-tenth of a thickness of the colloid layer.

13. An electronic device, comprising:

a camera module; and a housing assembly configured to protect the camera module, wherein the camera module is arranged on one side of the housing assembly, the housing assembly comprising:

a rear housing and a camera bracket mounted on the rear housing, wherein there is a gap between the camera bracket and the rear housing, and the rear housing is connected to an insulation tape, the insulation tape is located between the rear housing and the camera module, and the insulation tape isolates the gap from the camera module, and wherein the insulation tape comprises:

an insulation colloid and an insulation particle, and the insulation particle is doped in the insulation colloid, wherein breakdown field strength of the insulation particle is greater than breakdown field strength of the insulation colloid such that, under an electrostatic discharge (ESD), an electrostatic discharge current preferentially breaks down the insulation colloid and bypasses the insulation particle to lengthen a breakdown path, and the insulation particle is a highly electronegative non-polar insulation particle configured to suppress electron avalanche breakdown in a medium surrounding the insulation particle, and an electronegativity of the insulation particle is greater than an electronegativity of the insulation colloid.

14. The electronic device according to claim 13, wherein an insulation material of the insulation particle comprises tetrafluoroethene and/or tetrafluoroethylene polymer.

15. The electronic device according to claim 14, wherein the tetrafluoroethylene polymer comprises one or more of polytetrafluoroethylene, tetrafluoroethene-hexafluoropropylene copolymer, and heptafluoropropyltrifluorovinylether-polytetrafluoroethylene copolymer.

16. The electronic device according to claim 13, wherein a mass ratio of the insulation particle to the insulation colloid is in a range of 30% to 60%.

17. The electronic device according to claim 16, wherein the mass ratio of the insulation particle to the insulation colloid is 30%, 45%, 50%, 55%, or 60%.

18. The electronic device according to claim 13, wherein a material of the insulation colloid is rubber or plastic.

19. An insulation adhesive, comprising:

an insulation colloid; and an insulation particle, the insulation particle being doped in the insulation colloid, wherein breakdown field strength of the insulation particle is greater than breakdown field strength of the insulation colloid such that, under an electrostatic discharge (ESD), an electrostatic discharge current preferentially breaks down the insulation colloid and bypasses the insulation particle to lengthen a breakdown path, the insulation particle is a highly electronegative non-polar insulation particle configured to suppress electron avalanche breakdown in a medium surrounding the insulation particle, and an electronegativity of the insulation particle is greater than an electronegativity of the insulation colloid.

20. The insulation adhesive according to claim 19, wherein a mass ratio of the insulation particle to the insulation colloid is in a range of 45% to 60%;

an insulation material used for doping to form the insulation particle comprises tetrafluoroethylene polymer, and the tetrafluoroethylene polymer comprises one or more of tetrafluoroethylene-hexafluoropropylene copolymer and heptafluoropropyltrifluorovinylether-polytetrafluoroethylene copolymer, and a material of the insulation colloid comprises rubber or plastic.

* * * * *